United States Patent [19]

Miller

[11] Patent Number: 5,161,775
[45] Date of Patent: Nov. 10, 1992

[54] HIGH PRESSURE, HIGH FLOW FAST RESPONSE CONTROL VALVE

[75] Inventor: Terry L. Miller, Sterling, Ill.

[73] Assignee: Borg-Warner Automotive Electronic & Mechanical Systems Corporation, Sterling Heights, Mich.

[21] Appl. No.: 685,334

[22] Filed: Apr. 15, 1991

[51] Int. Cl.[5] .......................................... F16K 31/126
[52] U.S. Cl. .................................. 251/30.05; 251/61.1
[58] Field of Search .............. 251/30.05, 30.02, 30.01, 251/30.04, 30.03, 45, 46

[56] References Cited

U.S. PATENT DOCUMENTS

| | | | |
|---|---|---|---|
| 2,472,070 | 6/1949 | Garretson | 251/46 X |
| 4,081,171 | 3/1978 | Morgan et al. | 251/30.01 |
| 4,794,940 | 1/1989 | Albert et al. | 251/46 X |

Primary Examiner—Martin P. Schwadron
Assistant Examiner—Kevin L. Lee
Attorney, Agent, or Firm—Harness, Dickey & Pierce

[57] ABSTRACT

The fast response control valve employs two diaphragms (24, 26) joined to a common valve body (28) in a configuration which employs pressure acting on the larger diaphragm to ensure valve seating. The smaller diaphragm isolates the larger diaphragm from the fluid pressure reservoir. An electrical solenoid valve (40) toggles between a first state which supplies pressure to the larger diaphragm causing the valve to seat and a second state which vents the pressure acting on the large diaphragm allowing the valve body to unseat. If desired, the solenoid may be operated using a variable duty cycle drive signal (52) to control the response characteristics of the diaphragm valve.

18 Claims, 1 Drawing Sheet

HIGH PRESSURE, HIGH FLOW FAST RESPONSE CONTROL VALVE

BACKGROUND AND SUMMARY OF THE INVENTION

The present invention relates generally to control valves for fluid systems. More particularly, the invention relates to an electrically actuable dual diaphragm valve which assures the valve seat is closed by using the force developed by pressure from a first reservoir acting on a first diaphragm to offset the force developed by pressure from a second reservoir acting on a second diaphragm. The mechanical advantage of the first diaphragm over the second diaphragm is such that the desired valve seating is insured.

There are flow control valve applications which require a low differential pressure across the valve orifice and that can dictate that the valve orifice must be large. A large valve orifice can, in turn, dictate a large solenoid force acting against a large valve spring, in order to move the comparatively large valve body to the seated or unseated position. In many applications, the large solenoid needed for this purpose is prohibitive from a size, cost and electrical current requirement standpoint. Moreover, the large valve body of conventional design tends to be massive and comparatively sluggish and thus unsuited to fast response applications. Thus, it has heretofore been difficult and expensive to provide a fast response control valve which is capable of operating at high pressures and at high flow rates and which maintains a low differential pressure across the valve orifice.

One application which would benefit from a fast response control valve capable of handling high pressures and high flow rates is in the control of vehicular suspension systems by active electronic means. In these so-called active air suspension systems, electronic circuits can be devised to sense and respond to a road condition input (such as a road bump). If a suitably fast control valve were available, this electronically sensed road condition input could be used to control the suspension system to compensate for and minimize the impact felt by the vehicle occupants. Such a suitably fast control valve has heretofore been impractical, due in part to the need for a large solenoid and massive valve body to handle the required high pressures and high flow rates.

The present invention provides a control valve system which is well suited to the active air suspension system for vehicles and for other applications where high pressures and high flow rates are involved and where a fast response is desired. The control valve system is thus adapted for connection between a first reservoir (such as the air suspension system tank) and a second reservoir (such as the air suspension system reservoir).

The valve system employs a valve housing having a first conduit in communication with the first reservoir and a second conduit in communication with the second reservoir. A cavity is disposed in the valve housing in communication with the first and second conduits. Within the cavity is a diaphragm/valve body system comprising a first diaphragm and a second diaphragm, each preferably being mechanically coupled or integrally formed with a valve body member. The valve system includes a valve orifice within the housing which communicates with the first conduit. The valve body is disposed within the cavity and positioned where it can movably seat and unseat on the valve seat defined by the valve orifice.

The first diaphragm is connected to the sidewalls of the valve housing and defines a first chamber, the first chamber preferably being a portion of the cavity within the housing. The second diaphragm is also preferably connected to the sidewalls of the valve housing. The second diaphragm is arranged generally parallel to and spaced apart from the first diaphragm. The first and second diaphragms define between them a second chamber which is vented, preferably to atmosphere, by a venting means in the housing. The venting means may be in the form of an aperture through the sidewall of the housing which communicates with the second chamber.

The control valve system further comprises an electrically actuable means coupled to the first chamber and to the first conduit means for selectively assuming at least two states. The electrically actuable means assumes a first state in which the first chamber is coupled to the first conduit means and a second state in which the first chamber is vented. Preferably in the second state the first chamber is vented to atmosphere or to the same pressure condition as the second chamber is vented. The valve body associated with the first and second diaphragms is responsive to the first and second states of the electrically actuable means. When the electrically actuable means is in its first state, the valve body is seated on the valve seat, preventing flow between the first and second reservoirs. When the electrically actuable means is in the second state, the valve body is unseated from the valve seat, permitting flow between the first and second reservoirs.

The electrically actuable means is preferably a two-state solenoid valve which can be designed to toggle between states at high speeds. The preferred solenoid valve is also suitable for receiving pulse width modulated activation signals as will be explained more fully below.

The average surface area of the first diaphragm is greater than that of the second diaphragm. When the electrically actuable means is in the first state, fluid pressure is delivered to the first chamber where it acts on the first diaphragm, forcing the first diaphragm and valve body into the seated position. The relatively large surface area of the first diaphragm establishes a mechanical advantage such that the forces acting to seat the valve body are greater than the forces acting to unseat the valve body caused by pressure on the second diaphragm. Preferably the first chamber is fashioned to contain a minimal volume, sufficient to permit movement of the valve body to the unseated position. The minimal volume allows the first diaphragm to respond to comparatively small pressure changes at relatively fast response times. In effect, the second diaphragm isolates the first diaphragm from the pressures within the second reservoir. This allows the first diaphragm to operate at high speeds and still produce sufficient force to seat the valve body on a large valve orifice.

For a more complete understanding of the invention, its objects and advantages, reference may be had to the following specification and to the accompanying drawings.

DESCRIPTION OF THE PREFERRED EMBODIMENT

Figure 1:
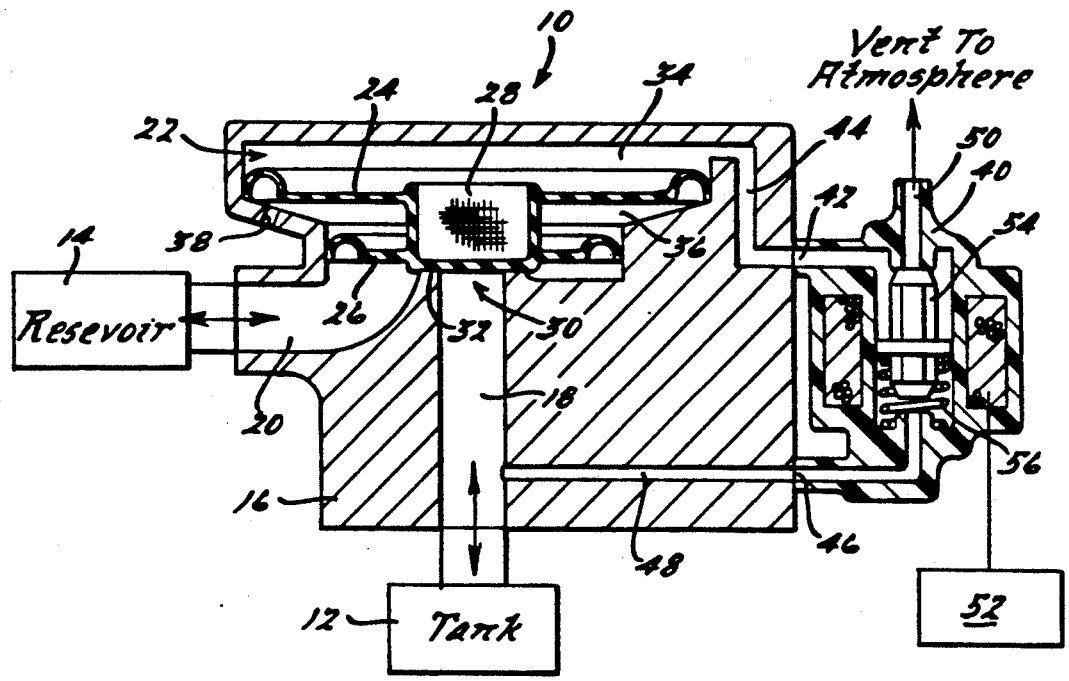
FIG. 1 is a cross sectional view of the presently preferred control valve system, showing the valve system in its first state.
Figure 2:
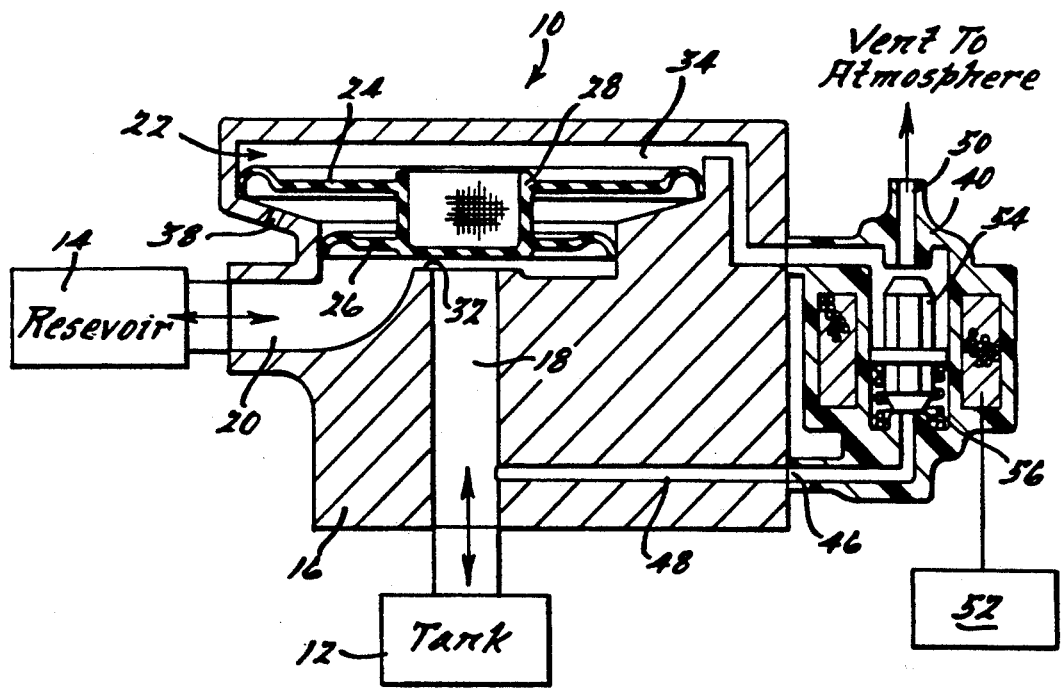
FIG. 2 is a cross sectional view of the presently preferred control valve system, showing the valve system in its second state.

Referring to FIGS. 1 and 2, the presently preferred control valve system is shown generally at 10. For illustration purposes the system is shown in the context of an active air suspension system utilizing a tank which is connected to a piston cylinder arrangement within the suspension system strut (not shown) and to a reservoir containing the system fluid (air) for operating the suspension system. Although the invention is shown in the context of an air suspension system, it has broader application. Accordingly, the air suspension system tank and reservoir components are also designated herein more generally as first reservoir 12 and second reservoir 14. As will be appreciated, the control valve system may be used to interconnect a wide variety of different fluid containment systems, hence the reservoir nomenclature used herein is not intended as a limitation upon the scope of the invention as set forth in the appended claims.

The control valve system includes a valve housing 16, which may be fabricated from any suitable material capable of withstanding the applicable pressures and flow rates involved. The presently preferred embodiment was developed to handle pressures on the order of 200 psi and flow rates of 2 to 3 cfm, or higher. At these operating parameters, the valve housing is preferably fabricated of aluminum or another suitable metal such as steel. Of course, in the appropriate applications plastics can also be employed. Moreover, the operating parameters for which the preferred embodiment was developed are not intended to be a limitation of the scope of the claim, but merely exemplary of one use of the invention.

The valve housing is fashioned to include a first conduit 18 which is adapted for communicating with first reservoir 12, and a second conduit 20 which is adapted for communicating with second reservoir 14. Valve housing 16 also defines a cavity shown generally at 22. As will be more fully explained, the cavity is partitioned into various chambers which have been given different reference numerals.

Disposed within cavity 22 is a first diaphragm 24 and a second diaphragm 26. As illustrated, the first diaphragm is larger than the second diaphragm. Preferably, the first and second diaphragms have a generally circular peripheral configuration. The radius of the first diaphragm is approximately twice that of the second diaphragm, resulting in the average surface area of the first diaphragm being approximately four times that of the second diaphragm. As illustrated, the first and second diaphragms are secured to the inner sidewalls of the cavity 22. A valve body 28 is mechanically joined to the first and second diaphragms generally at the centers thereof, as illustrated. If desired, the valve body may be integrally formed or molded with the first and second diaphragms. The first conduit 18 defines an orifice 30 which communicates with the cavity 22. The portion of the valve housing defining the periphery of orifice 30 is formed to comprise a valve seat 32 upon which valve body 28 can come to rest. Comparing FIGS. 1 and 2, valve body 28 is seated on valve seat 32 in FIG. 1 and is unseated in FIG. 2.

First diaphragm 24 defines a first chamber 34 which appears generally above the first diaphragm in FIGS. 1 and 2. Except for the passageway leading to an electrically actuable means described below, the first chamber is sealed from atmosphere.

The first and second diaphragms are generally parallel to one another and spaced apart to define a second chamber 36. Second chamber 36 is vented to atmosphere through aperture 38 in sidewall of the valve housing. As used herein the space outside the confines of valve housing 16 is considered to be at atmosphere. However, it should be appreciated that the entire valve system, including valve housing, could be placed in a containment and confined in an environment other than the earth's atmosphere. Accordingly, the representation by which various valve system components are vented to atmosphere should be understood to include the venting to a common environment or to a common pressure state including but not limited to the earth's atmosphere.

The control valve system further comprises an electrically actuable solenoid 40, which is preferably disposed on or formed as a portion of the valve housing 16. Of course, the electrically actuable solenoid can be located physically separate from the valve housing if desired. The electrically actuable solenoid 40 includes a first port 42 which communicates through first passageway 44 to the first chamber 34, a second port 46 which communicates through second passageway 48 to the first conduit 18, and a third port 50 which is vented to atmosphere (as defined herein).

The electrically actuable solenoid 40 is activated by a control circuit 52 to assume one of two states. In the first state (shown in FIG. 1) the armature 54 is urged by spring 56 into the at rest position in which the first port 42 and the second port 46 are coupled together and the third port 50 is blocked off. Thus, in this first position the first conduit is coupled through the electrically actuable solenoid to the first chamber 34. In this first state pressure from the first reservoir 12 is delivered to first chamber 34 where it acts upon first diaphragm 24 causing the valve body to seat. This is illustrated in FIG. 1.

In the second state (shown in FIG. 2) control circuit 52 is activated and energizes the solenoid coil, causing armature 54 to move in opposition to the force of spring 56 to the position shown in FIG. 2. In this second position the first port 42 is coupled to the third port 50, thereby venting the first chamber 34 to atmosphere. In this second state the second port 46 is blocked off. Fluid pressure from the second reservoir 14 acts on the second diaphragm 26 causing the valve body to move away from the orifice 30 to the unseated position shown in FIG. 2. Unseating of the valve body allows fluid to flow between the first and second reservoirs through first and second conduits 18 and 20.

By energizing (FIG. 2) and de-energizing (FIG. 1) the electrically actuable solenoid it is thus possible to unseat and seat the valve body at a very rapid rate. The presently preferred embodiment has been able to achieve a response time in the neighborhood of 600 to 800 milliseconds and it is believed that faster response times are possible. To reduce response times the valve system can be constructed to minimize the volume defined by first chamber 34. The first chamber 34 is sized and configured to permit the valve body to move to the unseated position shown in FIG. 2. The valve system response time can be shortened by making the first chamber 34 smaller.

In some applications it may be desirable to control the valve system response time as a dynamically adjusted variable. The invention includes a provision for doing this in which the control circuit 52 supplies a signal to the electrically actuable solenoid means which varies in duty cycle. By cycling or toggling the solenoid back and forth using an alternating signal, it is possible to meter precise quantities of fluid into and out from the first chamber 34, to effect precise control over the response time of the valve system. The frequency of the alternating signal can also be altered to affect the response of the valve system. By altering the duty cycle of the drive signal to the electrically actuable solenoid means, it is possible to control the pressure level within the first chamber 34 and thereby control the response time of the valve system. Allowing full pressure to be delivered to the first chamber 34 (100% duty cycle), a fast response time is achieved. Allowing less than full pressure, by periodically venting to atmosphere for a short duration (less than 100% duty cycle), a slower response time is achieved. It will be appreciated that the relative size of the ports 42, 46 and 50 also affect the degree to which valve response time can be altered through variable duty cycle modulation.

While the present invention has been described in a presently preferred embodiment suitable for an active air suspension system application, it should be understood that the principles of the invention can be employed using other embodiments and in a wide range of other applications. Accordingly, certain modifications and changes can be made to the control valve system described herein without departing from the spirit of the invention as set forth in appended claims.

What is claimed is:

1. A control valve system for controlling flow between a first reservoir and a second reservoir comprising:
   a valve housing;
   first conduit means in said valve housing for communicating with said first reservoir;
   second conduit means in said valve housing for communicating with said second reservoir;
   a cavity in said valve housing communicating with said first and second conduit means;
   a first diaphragm disposed in said cavity which defines a first chamber;
   a second diaphragm disposed in said cavity which, with said first diaphragm, defines a second chamber, said first and second diaphragms integrally formed with one another and including a cup shaped portion between one another;
   a valve orifice communicating with said first conduit means and defining a valve seat within said housing;
   a valve body coupled to said first and second diaphragms at said cup shaped portion and disposed in said cavity for movably seating and unseating on said valve seat;
   venting means in said housing and communicating with said second chamber;
   electrically actuable means coupled to said first chamber and to said first conduit means for selectively assuming:
   (a) a first state in which said first chamber is coupled to said first conduit means; and
   (b) a second state in which said first chamber is vented;
   said valve body being freely suspended by said first and second diaphragms in an unbiased ambient condition and being movable between respective seated and unseated positions in response to fluid pressures introduced through said first conduit under control of said electrically actuable means;
   said valve body being responsive to said first and second states of said electrically actuable means whereby in said first state fluid pressure from said first conduit is applied to said first diaphragm causing said valve body to assume a seated position on said valve seat preventing flow between said fist and second reservoirs and in second state fluid pressure on said first diaphragm is vented causing said valve body to assume an unseated position from said valve seat permitting flow between said first and second reservoirs.

2. The valve system of claim 1 wherein said first and second diaphragms and said valve body are integrally formed.

3. The valve system of claim 1 wherein said venting means comprises an aperture in said valve housing to allow said second chamber to vent to atmosphere.

4. The valve system of claim 1 wherein said electrically actuable means comprises a two position solenoid valve.

5. The valve system of claim 1 wherein said electrically actuable means has a first port coupled to said first conduit means and a second port vented to atmosphere.

6. The valve system of claim 1 wherein said first diaphragm defines a surface area greater than the surface area of said second diaphragm.

7. The valve system of claim 1 wherein said first diaphragm defines a surface area about four times greater than the surface area of said second diaphragm.

8. The valve system of claim 1 wherein said first chamber is configured to contain the minimum volume adequate to permit movement of said valve body to the unseated position.

9. The valve system of claim 1 wherein said electrically actuable means in said second state and said venting means both vent to a common pressure.

10. A control valve system for controlling flow between a first reservoir and a second reservoir with a controlled response time comprising:
    a valve housing;
    a first conduit means in said valve housing for communicating with said first reservoir;
    second conduit means in said valve housing for communicating with said second reservoir;
    a cavity in said valve housing communicating with said first and second conduit means;
    a first diaphragm disposed in said cavity which defines a first chamber;
    a second diaphragm disposed in said cavity which, with said first diaphragm, defines a second chamber, said first and second diaphragms integrally formed with one another and including a cup shaped portion between one another;
    a valve orifice communicating with said first conduit means and defining a valve seat within said housing;
    a valve body coupled to said first and second diaphragms at said cup shaped portion and disposed in said cavity for movably seating and unseating on said valve seat;

venting means in said housing and communicating with said second chamber;

electrically actuable means coupled to said first chamber and to said first conduit means for selectively assuming:
  (a) a first state in which said first chamber is coupled to said first conduit means; and
  (b) a second state in which said first chamber is vented;

means for providing a modulated electrical signal to actuate and electrically actuable means;

said valve body being responsive to said first and second states of said electrically actuable means wherein said first state said valve body is seated on said valve seat preventing flow between said first and second reservoirs and in said second state said valve body is unseated from said valve seat permitting flow between said first and second reservoirs;

wherein said means for providing a modulated electrical signal to actuate said electrically actuable means provides a pulse width modulated signal in which the duty cycle of said pulse width modulated signal regulates said response time.

11. The valve system of claim 1 wherein said first and second diaphragms and said valve body are integrally formed.

12. The valve system of claim 1 wherein said venting means comprises an aperture in said valve housing to allow said second chamber to vent to atmosphere.

13. The valve system of claim 1 wherein said electrically actuable means comprises a two position solenoid valve.

14. The valve system of claim 1 wherein said electrically actuable means has a first port coupled to said first conduit means and a second port vented to atmosphere.

15. The valve system of claim 1 wherein said first diaphragm defines a surface area greater than the surface area of said second diaphragm.

16. The valve system of claim 1 wherein said first diaphragm defines a surface area about four times greater than the surface area of said second diaphragm.

17. The valve system of claim 1 wherein said first chamber is configured to contain the minimum volume adequate to permit movement of said valve body to the unseated position.

18. The valve system of claim 1 wherein said electrically actuable means in said second state and said venting means both vent to a common pressure.

* * * * *